US012412511B2

(12) United States Patent
Kim et al.

(10) Patent No.: US 12,412,511 B2
(45) Date of Patent: Sep. 9, 2025

(54) PIXEL CIRCUIT AND DISPLAY DEVICE INCLUDING THE SAME

(71) Applicant: LG Display Co., Ltd., Seoul (KR)

(72) Inventors: Minseok Kim, Seoul (KR); Buyeol Lee, Seoul (KR); Hun Jang, Paju-si (KR); Sanghoon Jung, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/395,352

(22) Filed: Dec. 22, 2023

(65) Prior Publication Data

US 2024/0221618 A1 Jul. 4, 2024

(30) Foreign Application Priority Data

Dec. 30, 2022 (KR) ........................ 10-2022-0191286

(51) Int. Cl.
*G09G 3/32* (2016.01)

(52) U.S. Cl.
CPC ....... *G09G 3/32* (2013.01); *G09G 2300/0452* (2013.01); *G09G 2300/0819* (2013.01); *G09G 2300/0842* (2013.01)

(58) Field of Classification Search
CPC ............. G09G 3/32; G09G 2300/0452; G09G 2300/0819; G09G 2300/0842
See application file for complete search history.

(56) References Cited

U.S. PATENT DOCUMENTS 7,561,124 B2 7/2009 Kwak et al.
11,004,383 B2 5/2021 Jang et al.
11,611,016 B2 3/2023 Kim et al.
2020/0363683 A1* 11/2020 Sadamitsu ........... G02B 6/0068
2021/0336083 A1 10/2021 Kim et al.
2022/0231002 A1* 7/2022 Kim .......................... G09F 9/33
2022/0415247 A1* 12/2022 Liao ......................... G09G 3/32
2023/0111185 A1* 4/2023 Sun ....................... H01L 25/167 257/40
2023/0419890 A1* 12/2023 Kim ......................... G09G 3/32

FOREIGN PATENT DOCUMENTS

KR 10-2005-0046467 A 5/2005
KR 10-2019-0067344 A 6/2019
KR 10-2021-0131496 A 11/2021

OTHER PUBLICATIONS

Korean Intellectual Property Office, Office Action, Korean Patent Application No. 10-2022-0191286, Jul. 28, 2025, 20 pages.

* cited by examiner

*Primary Examiner* — Kenneth B Lee, Jr.
(74) *Attorney, Agent, or Firm* — Fenwick & West LLP

(57) ABSTRACT

Disclosed is a transparent micro-LED unit pixel circuit capable of driving red, green, and blue micro-LED elements with one driving transistor to increase an area size of a transmissive area, and a transparent micro-LED display device including the same. The transparent micro-LED unit pixel circuit includes first to third micro-LEDs emitting light based on a driving current; a driving transistor configured to control the driving current, wherein the driving transistor is disposed between and connected to an anode electrode of each of the first micro-LED, the second micro-LED, and the third micro-LED and a high-potential power line; a storage capacitor disposed between and connected to a gate electrode and a source electrode of the driving transistor; and a first transistor configured to apply a data voltage to the gate electrode of the driving transistor.

15 Claims, 11 Drawing Sheets

PIXEL CIRCUIT AND DISPLAY DEVICE INCLUDING THE SAME

CROSS-REFERENCE TO RELATED APPLICATION

This application claims priority from Korean Patent Application No. 10-2022-0191286 filed on Dec. 30, 2022 in the Korean Intellectual Property Office, and all the benefits accruing therefrom under 35 U.S.C. 119, the contents of which in its entirety are herein incorporated by reference.

BACKGROUND

Field

The present disclosure relates to a display device, and more particularly, to a pixel circuit including a transparent micro-LED, and a transparent micro-LED display device including the pixel circuit.

Description of Related Art

A display device is widely used as a display screen for not only televisions or monitors but also notebook computers, tablet computers, smart phones, portable display devices, and portable information devices.

Recently, research and development on a micro-LED display device using a micro-sized micro-LED as a light-emitting element are in progress. Because the micro-LED display device has high image quality and high reliability, the micro-LED display device is in the limelight as a next-generation display device.

Further, as development of the display device is being actively carried out, diversity in terms of different from existing designs is required. Further, a transparent display device capable of enhancing an aesthetic function, and providing multifunctionality in use has been proposed.

SUMMARY

A transparent display panel may include a light-emitting area and a transmissive area in a display area. A plurality of pixels may be disposed in the light-emitting area. An area size of each of the light-emitting area and the transmissive area may be designed based on light-emitting efficiency and transparency. In a structure in which one driving transistor drives one light-emitting element, increase in the area size of the transmissive area of the transparent display panel may be limited.

A purpose of embodiments of the present disclosure is to provide a pixel circuit capable of driving red, green, and blue micro-LED elements with one driving transistor to increase the area size of the transmissive area.

A purpose of embodiments of the present disclosure is to provide a transparent micro-LED unit pixel circuit capable of driving red, green and blue micro-LED elements with one driving transistor to increase the area size of the transmissive area, and to provide a transparent micro-LED display device including the transparent micro-LED unit pixel circuit.

Purposes according to the present disclosure are not limited to the above-mentioned purpose. Other purposes and advantages according to the present disclosure that are not mentioned may be understood based on following descriptions, and may be more clearly understood based on embodiments according to the present disclosure. Further, it will be easily understood that the purposes and advantages according to the present disclosure may be realized using means shown in the claims or combinations thereof.

A first aspect of the present disclosure provides a transparent micro-LED unit pixel circuit comprising: a first micro-LED, a second micro-LED and a third micro-LED configured to emit light based on a driving current; a driving transistor configured to control the driving current, wherein the driving transistor is connected between a high-potential power line and an anode electrode of each of the first micro-LED, the second micro-LED, and the third micro-LED; a storage capacitor connected between a gate electrode and a source electrode of the driving transistor; and a first transistor configured to apply a data voltage to the gate electrode of the driving transistor.

A second aspect of the present disclosure provides a transparent micro-LED unit pixel circuit comprising: a first micro-LED, a second micro-LED and a third micro-LED configured to emit light based on a driving current; a driving transistor configured to control the driving current, wherein the driving transistor is connected between a low-potential power line and a cathode electrode of each of the first micro-LED, the second micro-LED, and the third micro-LED; a storage capacitor connected between a gate electrode and a source electrode of the driving transistor; and a first transistor configured to apply a data voltage to the gate electrode of the driving transistor.

A third aspect of the present disclosure provides a transparent micro-LED unit pixel circuit comprising: a first micro-LED, a second micro-LED and a third micro-LED configured to emit light based on a driving current; a first scan transistor connected to an anode electrode of the first micro-LED; a second scan transistor connected to an anode electrode of the second micro-LED; a third scan transistor connected to an anode electrode of the third micro-LED; a driving transistor configured to control the driving current, wherein the driving transistor is connected between a high-potential power line and each of the first scan transistor, the second scan transistor, and the third scan transistor; a storage capacitor connected between a gate electrode and a source electrode of the driving transistor; and a first transistor configured to apply a data voltage to the gate electrode of the driving transistor.

A fourth aspect of the present disclosure provides a transparent micro-LED display device comprising: a transparent display panel including a light-emitting area and a transmissive area, wherein the light-emitting area includes a plurality of unit pixel circuits; wherein each of the plurality of unit pixel circuits includes: a first micro-LED, a second micro-LED and a third micro-LED configured to emit light based on a driving current; a driving transistor configured to control the driving current, wherein the driving transistor is connected between a high-potential power line and an anode electrode of each of the first micro-LED, the second micro-LED, and the third micro-LED; a storage capacitor connected between a gate electrode and a source electrode of the driving transistor; and a first transistor configured to apply a data voltage to the gate electrode of the driving transistor.

A fifth aspect of the present disclosure provides a micro-LED display device comprising: a display panel including a light-emitting area, wherein the light-emitting area includes a plurality of unit pixel circuits: wherein at least one of the unit pixel circuits includes: a plurality of micro-LEDs configured to emit light based on a driving current: and a driving transistor coupled to the plurality of micro-LEDs and configured to control the driving current through a selected one of the micro-LEDs to emit light.

According to the first to forth aspects of the present disclosure, driving the red, green, and blue micro-LED elements with one driving transistor may allow the area size of the transmissive area to be increased.

Further, increasing the area size of the transmissive area of the transparent display panel may allow transparency thereof to be improved.

Further, improving the transparency of the transparent display panel may allow the aesthetic function and multi-functions in use to be achieved.

Effects of the present disclosure are not limited to the effects as mentioned above, and other effects not mentioned will be clearly understood by those skilled in the art from the descriptions below.

In addition to the effects as described above, specific effects of the present disclosure will be described together while describing specific details for carrying out the present disclosure.

DETAILED DESCRIPTIONS

Figure 1:
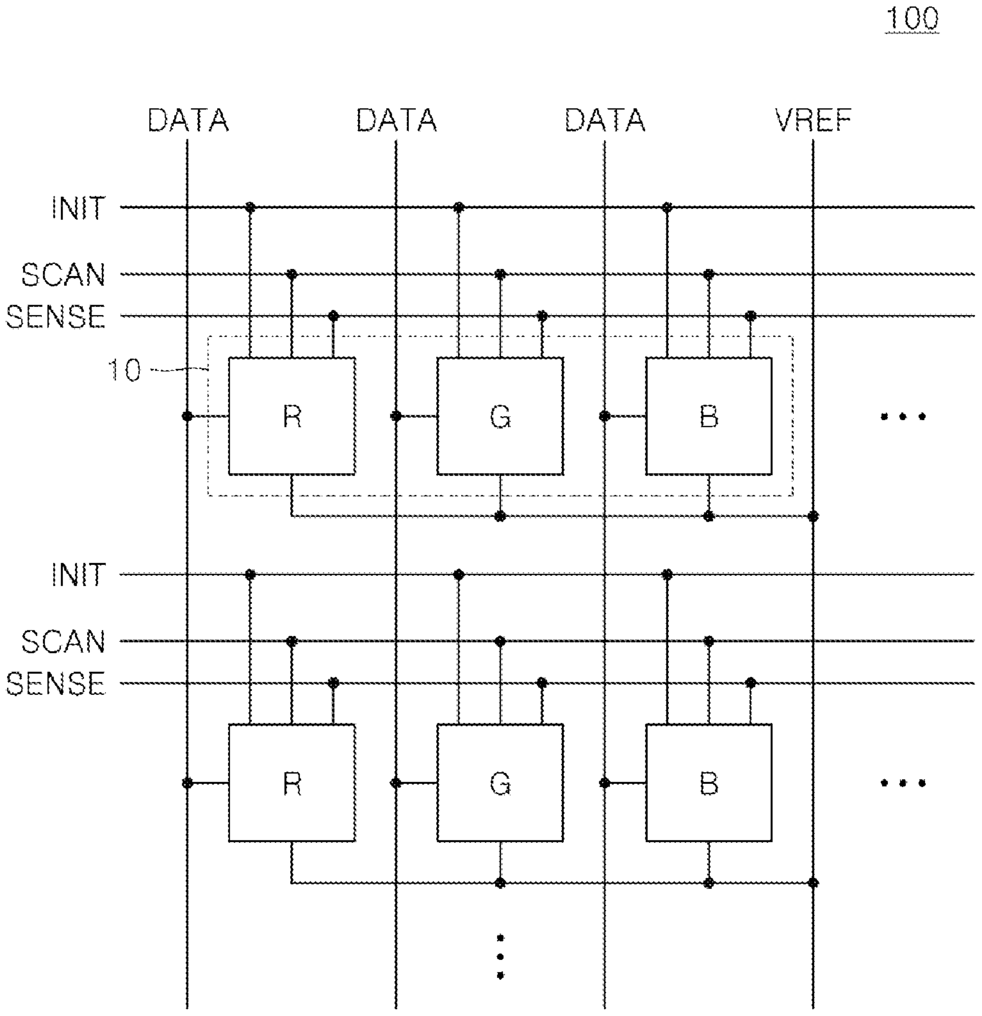
FIG. 1 shows a transparent micro-LED display device according to an embodiment.

Advantages and features of the present disclosure, and a method of achieving the advantages and features will become apparent with reference to embodiments described later in detail together with the accompanying drawings. However, the present disclosure is not limited to the embodiments as disclosed under, but may be implemented in various different forms. Thus, these embodiments are set forth only to make the present disclosure complete, and to completely inform the scope of the present disclosure to those of ordinary skill in the technical field to which the present disclosure belongs, and the present disclosure is only defined by the scope of the claims.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

A shape, a size, a ratio, an angle, a number, etc. disclosed in the drawings for describing embodiments of the present disclosure are illustrative, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The terminology used herein is directed to the purpose of describing particular embodiments only and is not intended to be limiting of the present disclosure. As used herein, the singular constitutes “a” and “an” are intended to include the plural constitutes as well, unless the context clearly indicates otherwise. It will be further understood that the terms “comprise”, “including”, “include”, and “including” when used in this specification, specify the presence of the stated features, integers, operations, elements, and/or components, but do not preclude the presence or addition of one or more other features, integers, operations, elements, components, and/or portions thereof. As used herein, the term “and/or” includes any and all combinations of one or more of associated listed items. Expression such as “at least one of” when preceding a list of elements may modify the entire list of elements and may not modify the individual elements of the list. In interpretation of numerical values, an error or tolerance therein may occur even when there is no explicit description thereof.

In addition, it will also be understood that when a first element or layer is referred to as being present “on” a second element or layer, the first element may be disposed directly on the second element or may be disposed indirectly on the second element with a third element or layer being disposed between the first and second elements or layers. It will be understood that when an element or layer is referred to as being “connected to”, or “connected to” another element or layer, it may be directly on, connected to, or connected to the other element or layer, or one or more intervening elements or layers may be present. In addition, it will also be understood that when an element or layer is referred to as being “between” two elements or layers, it may be the only element or layer between the two elements or layers, or one or more intervening elements or layers may also be present.

Further, as used herein, when a layer, film, region, plate, or the like is disposed “on” or “on a top” of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

In descriptions of temporal relationships, for example, temporal precedent relationships between two events such as "after", "subsequent to", "before", etc., another event may occur therebetween unless "directly after", "directly subsequent" or "directly before" is not indicated.

When a certain embodiment can be implemented differently, a function or an operation specified in a specific block may occur in a different order from an order specified in a flowchart. For example, two blocks in succession may be actually performed substantially concurrently, or the two blocks may be performed in a reverse order depending on a function or operation involved.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described under could be termed a second element, component, region, layer or section, without departing from the spirit and scope of the present disclosure.

The features of the various embodiments of the present disclosure may be partially or entirely combined with each other, and may be technically associated with each other or operate with each other. The embodiments may be implemented independently of each other and may be implemented together in an association relationship.

In interpreting a numerical value, the value is interpreted as including an error range unless there is no separate explicit description thereof.

It will be understood that when an element or layer is referred to as being "connected to", or "connected to" another element or layer, it may be directly on, connected to, or connected to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

The features of the various embodiments of the present disclosure may be partially or entirely combined with each other, and may be technically associated with each other or operate with each other. The embodiments may be implemented independently of each other and may be implemented together in an association relationship.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a transparent micro-LED unit pixel circuit according to some embodiments and a transparent micro-LED display device including the same will be described.

FIG. 1 shows a transparent micro-LED display device according to an embodiment.

Referring to FIG. 1, the transparent micro-LED display device includes a transparent display panel 100 having a plurality of unit pixel circuits 10.

Each of the plurality of unit pixel circuits 10 includes sub-pixels. The sub-pixels may include red, green, and blue sub-pixels R, G, and B. Alternatively, the sub-pixels may include red, green, blue, and white sub-pixels R, G, B, and W.

Each sub-pixel may be connected or connected to a data line to which a data voltage is applied, a sensing line to which a reference voltage VREF is applied, an initialization line to which an initialization signal INIT is applied, a scan line to which a scan signal SCAN is applied, and a sense signal line to which a sensing signal SENSE is applied. Further, each sub-pixel may be connected to a high-potential power line to which a high-potential voltage is applied, a low-potential power line to which a low-potential voltage is applied, and a power line to which an initialization voltage is applied.

The transparent display panel 100 may include a light-emitting area and a transmissive area. The sub-pixels may be disposed in the light-emitting area. An area in which the sub-pixels are not disposed may be designated as the transmissive area. An area size of each of the light-emitting area and the transmissive area may be designed based on light-emitting efficiency and transparency.

Figure 2:
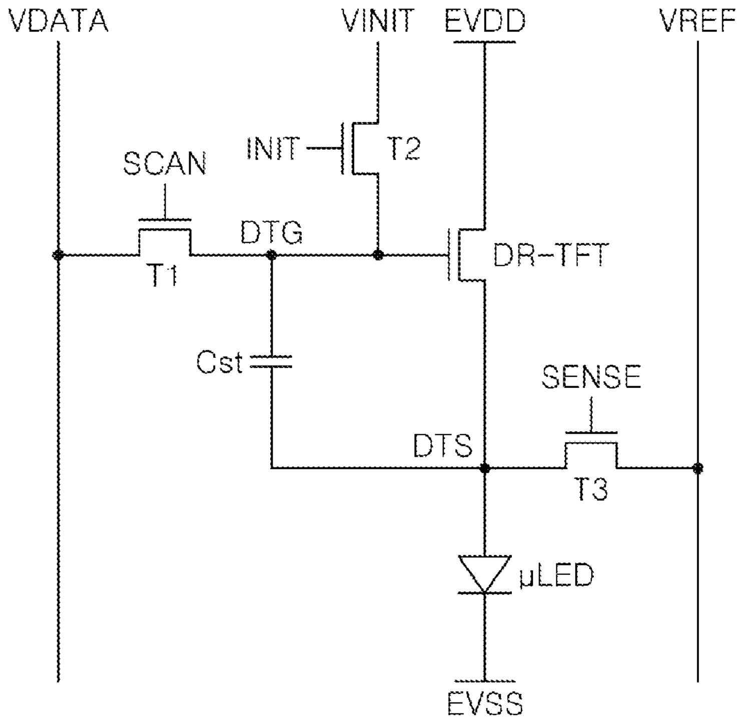
FIG. 2 shows a sub-pixel circuit of a unit pixel circuit in FIG. 1.

FIG. 2 shows a sub-pixel circuit of a unit pixel circuit in FIG. 1. A sub-pixel circuit may be an R, G, B, or W sub-pixel circuit.

Referring to FIG. 1 and FIG. 2, each of the sub-pixel circuits of the unit pixel circuit 10 includes a micro-LED uLED, a driving transistor DR-TFT, a storage capacitor Cst, a first transistor T1, a second transistor T2 and a third transistor T3.

The micro-LED uLED emits light based on driving current. The micro-LED uLED has an anode electrode connected to a source electrode of the driving transistor DR-TFT, and a cathode electrode connected to the low-potential power line. A low-potential voltage EVSS may be applied to the low-potential power line.

The driving transistor DR-TFT controls the driving current and is disposed between and connected to the anode electrode of the micro-LED and the high-potential power line. The driving transistor DR-TFT includes the source electrode, a gate electrode, and a drain electrode. The gate electrode thereof corresponds to a node DTG, and the source electrode thereof corresponds to a node DTS. The high-potential power line is connected to the drain electrode. A high-potential voltage EVDD is applied to the high-potential power line.

The storage capacitor Cst is disposed between and connected to the gate electrode and the source electrode of the driving transistor DR-TFT. The storage capacitor Cst may sample a data voltage $V_{DATA}$ when the first transistor T1 is turned on, and may boost the gate electrode of the driving transistor.

The first transistor T1 is disposed between and connected to the data line and the gate electrode of the driving transistor DR-TFT. Further, the first transistor T1 is disposed between and connected to the data line and one electrode of the storage capacitor Cst. The data voltage $V_{DATA}$ is applied to the data line. The first transistor T1 transmits the data voltage $V_{DATA}$ to the node DTG in response to the scan signal SCAN.

The second transistor T2 is disposed between and connected to the initialization power line and the node DTG. The initialization voltage VINIT is applied to the initialization power line. The second transistor T2 may initialize the node DTG with the initialization voltage VINIT in response to the initialization signal INIT.

The third transistor T3 is disposed between and connected to the reference power line and the node DTS. The reference voltage VREF is applied to the reference power line. The third transistor T3 may precharge the node DTS with the reference voltage VREF in response to the sensing signal SENSE.

According to embodiments, at least one of the driving transistor DR-TFT, the first transistor T1, the second transistor T2, and the third transistor T3 may be implemented as an LTPS (Low Temperature Polycrystalline Oxide) transistor or an oxide semiconductor transistor. However, the present disclosure is not limited thereto. For example, at least one of the driving transistor DR-TFT, the first transistor T1, the second transistor T2, and the third transistor T3 may be embodied as a P-type oxide thin-film transistor including a P-type oxide semiconductor layer. Alternatively, at least one of the driving transistor DR-TFT, the first transistor T1, the second transistor T2, and the third transistor T3 may be embodied as an N-type oxide thin-film transistor including an N-type oxide semiconductor layer.

In the transparent micro-LED display device, each of the unit pixel circuits 10 may be composed of R, G, and B sub-pixels. In this case, each sub-pixel requires 4 thin-film transistors and 1 storage capacitor. Thus, each unit sub-pixel 10 requires 12 thin-film transistors and 3 storage capacitors.

Thus, it may be difficult for the area size of the transmissive area of the transparent display panel to increase to a target area size.

Figure 3:
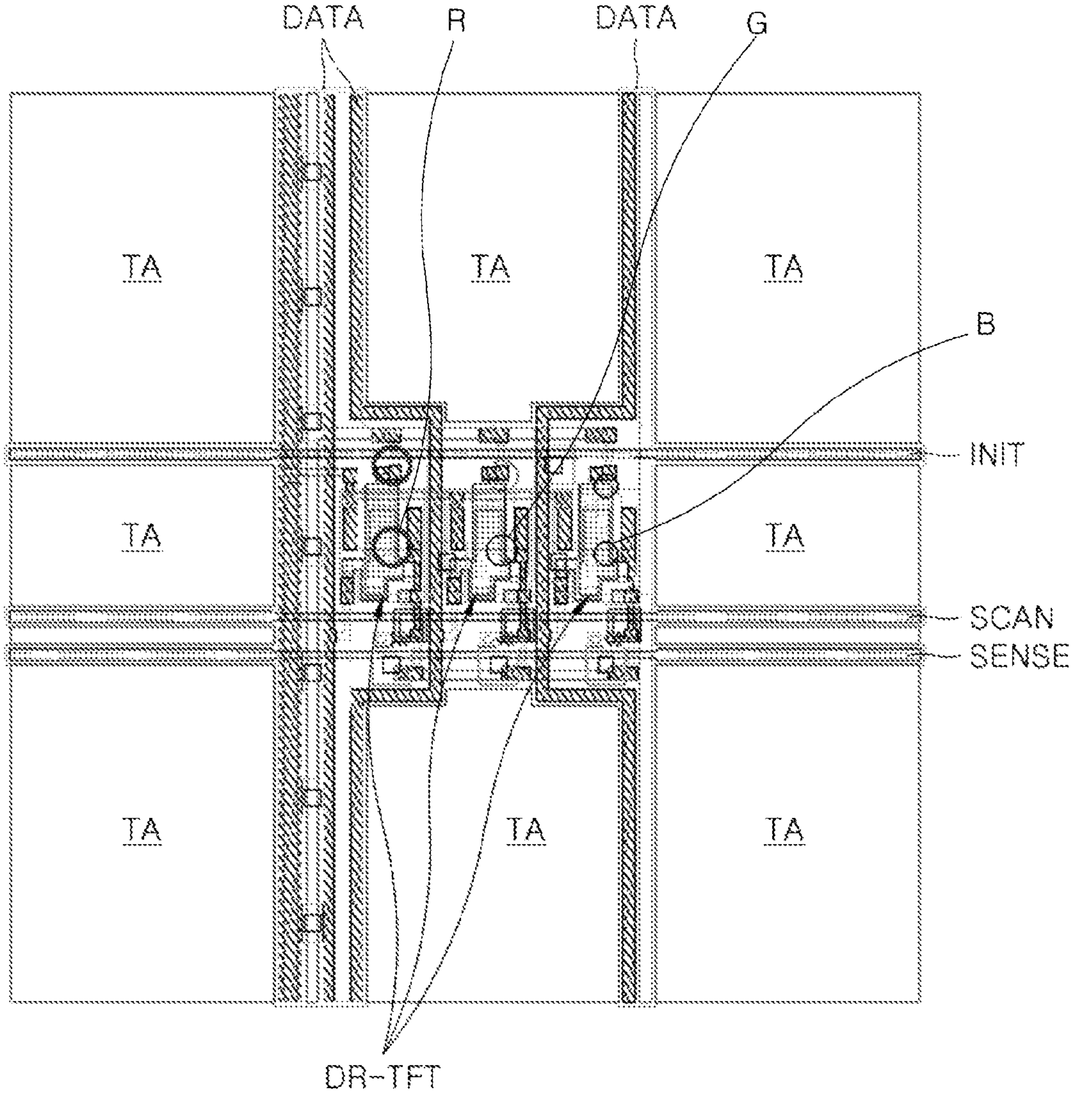
FIG. 3 shows a layout of a unit pixel circuit in FIG. 1.

FIG. 3 shows a layout of the unit pixel circuit in FIG. 1.

Referring to FIG. 1 to FIG. 3, each sub-pixel requires 4 thin-film transistors and 1 storage capacitor, and thus, each unit sub-pixel 10 requires 12 thin-film transistors and 3 storage capacitors. Further, power lines are required in each sub-pixel. Thus, there is a limit in increasing the area size of the transmissive area TA of the transparent display panel, and thus it is difficult to achieve the transparency higher or equal to 70%.

Figure 4:
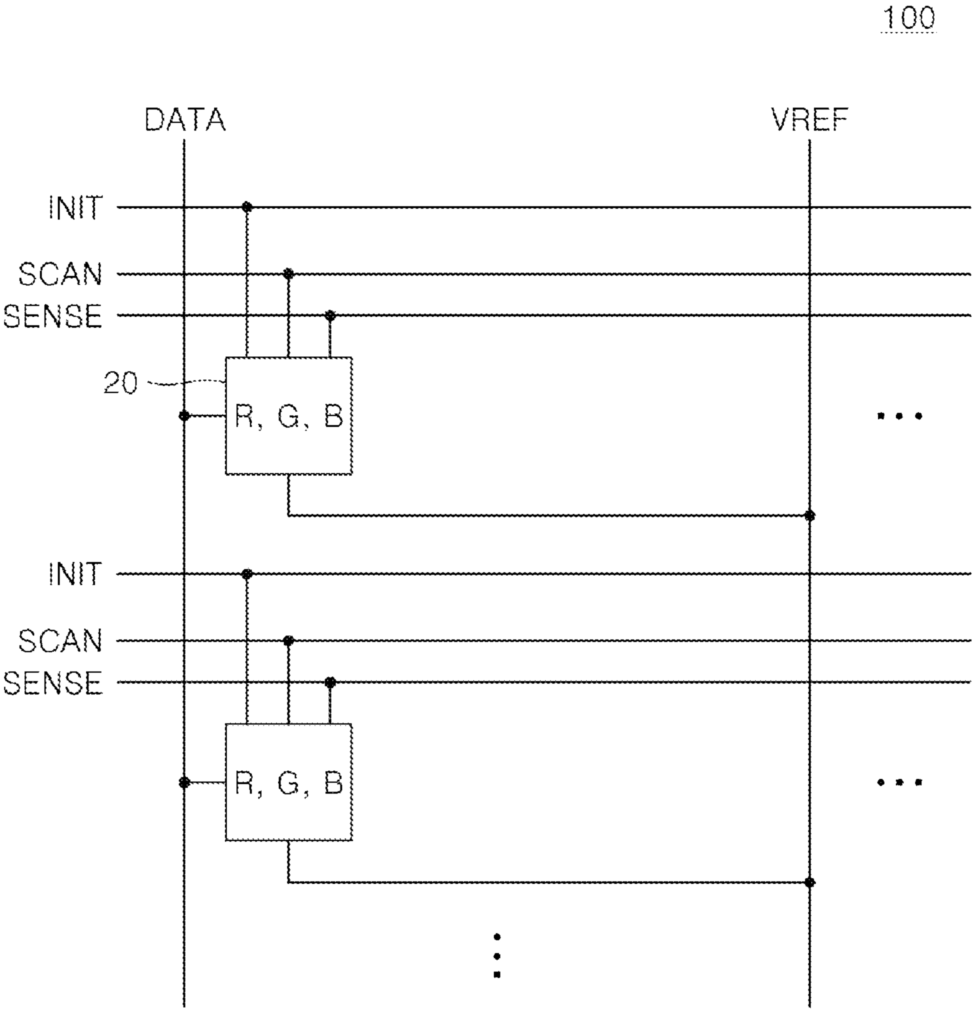
FIG. 4 shows a transparent micro-LED display device according to another embodiment.

FIG. 4 shows a transparent micro-LED display device according to another embodiment.

Referring to FIG. 4, the transparent micro-LED display device includes the transparent display panel 100 having a plurality of unit pixel circuits 20.

In each of the plurality of unit pixel circuits 20, one driving transistor may drive red, green, and blue micro-LEDs R, G, and B. Alternatively, in each of the plurality of unit pixel circuits 20, one driving transistor may drive red, green, blue, and white micro-LEDs R, G, B, and W.

The unit pixel circuit 20 is connected or coupled to the data line to which the data voltage is applied, the sensing line to which the reference voltage VREF is applied, the initialization line to which the initialization signal INIT is applied, the scan line to which the scan signal SCAN is applied, and the sense line to which the sensing signal SENSE is applied.

Further, the unit pixel circuit 20 may be connected to the high-potential power line to which the high-potential voltage is applied, the low-potential power line to which the low-potential voltage is applied, and the power line to which the initialization voltage is applied. In one example, in the unit pixel circuit 20, cathode electrodes of the red, green, and blue micro-LEDs R, G, and B may be respectively connected to a first low-potential power line to a third low-potential power line. In another example, in the unit pixel circuit 20, anode electrodes of the red, green, and blue micro-LEDs R, G, and B may be respectively connected to a first high-potential power line to a third high-potential power line.

Figure 5:
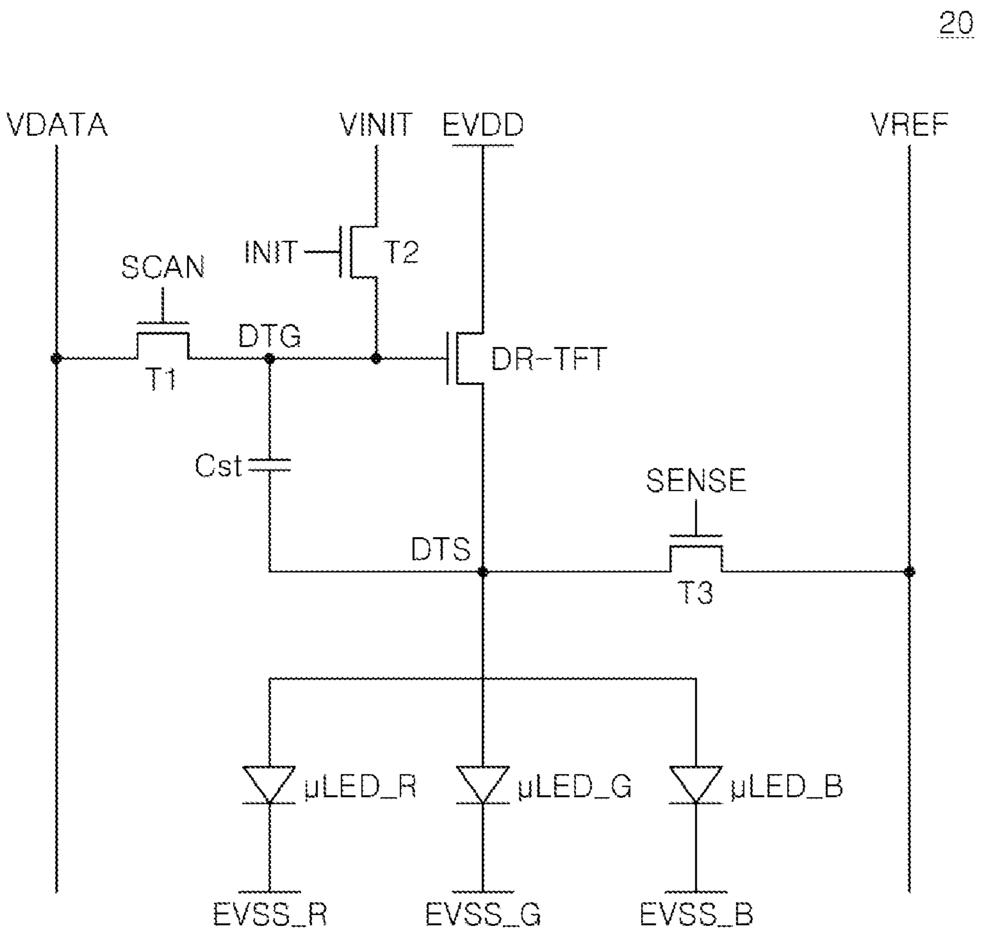
FIG. 5 shows a unit pixel circuit according to a first embodiment.

FIG. 5 shows a unit pixel circuit according to a first embodiment.

Referring to FIG. 4 and FIG. 5, the unit pixel circuit 20 according to the first embodiment includes a first micro-LED uLED_R, a second micro-LED uLED_G, a third micro-LED uLED_B, the driving transistor DR-TFT, the storage capacitor Cst, the first transistor T1, the second transistor T2 and the third transistor T3.

Each of the first micro-LED uLED_R, the second micro-LED uLED_G, and the third micro-LED uLED_B emits light based on the driving current.

The anode electrode of the first micro-LED uLED_R, is connected to the source electrode of the driving transistor DR-TFT, and the cathode electrode thereof is connected to a first low-potential power line EVSS_R.

The anode electrode of the second micro-LED uLED_G is connected to the source electrode of the driving transistor DR-TFT, and the cathode electrode thereof is connected to a second low-potential power line EVSS_G.

The anode electrode of the third micro-LED uLED_B is connected to the source electrode of the driving transistor DR-TFT, and the cathode electrode thereof is connected to a third low-potential power line EVSS_B.

The low-potential voltage EVSS or the high-potential voltage EVDD may be applied to the first low-potential power line EVSS_R to the third low-potential power line EVSS_B.

In one example, when the display device allows the first micro-LED uLED_R to emit light, the low-potential voltage EVSS may be applied to the first low-potential power line EVSS_R, while the high-potential voltage EVDD may be applied to the second low-potential power line EVSS_G and the third low-potential power line EVSS_B.

In one example, when the display device allows the second micro-LED uLED_G to emit light, the low-potential voltage EVSS may be applied to the second low-potential power line EVSS_G, while the high-potential voltage EVDD may be applied to the first low-potential power line EVSS_R and the third low-potential power line EVSS_B.

In one example, when the display device allows the third micro-LED uLED_B to emit light, the low-potential voltage EVSS may be applied to the third low-potential power line EVSS_B, while the high-potential voltage EVDD may be applied to the first low-potential power line EVSS_R and the second low-potential power line EVSS_G.

The driving transistor DR-TFT controls the driving current and is disposed between and connected to the anode electrode of each of the first micro-LED uLED_R, the second micro-LED uLED_G, and the third micro-LED uLED_B and the high-potential power line to which the high-potential voltage EVDD is applied. The driving transistor DR-TFT includes the source electrode corresponding to the node DTS, the gate electrode corresponding to the node DTG, and the drain electrode to which the high-potential voltage EVDD is applied.

The storage capacitor Cst is disposed between and connected to the gate electrode and the source electrode of the driving transistor DR-TFT. The storage capacitor Cst may sample the data voltage $V_{DATA}$ when the first transistor T1 is turned on, and may boost the gate electrode of the driving transistor DR-TFT.

The first transistor T1 is disposed between and connected to the data line to which the data voltage $V_{DATA}$ is applied and the gate electrode of the driving transistor DR-TFT. Further, the first transistor T1 is disposed between and connected to the data line and one electrode of the storage capacitor Cst. The first transistor T1 transmits the data voltage $V_{DATA}$ to the node DTG in response to the scan signal SCAN.

The second transistor T2 is disposed between and connected to the initialization power line to which the initialization voltage VINIT is applied and the node DTG. The second transistor T2 initializes the node DTG corresponding to the gate electrode of the driving transistor DR-TFT in response to the initialization signal INIT.

The third transistor T3 is disposed between and connected to the reference power line to which the reference voltage VREF is applied and the node DTS. The third transistor T3 precharges the node DTS corresponding to the source electrode of the driving transistor DR-TFT with the reference voltage VREF in response to the sensing signal SENSE.

Each of the driving transistor DR-TFT, the first transistor T1, the second transistor T2, and the third transistor T3 may be embodied as an NMOS transistor.

In this way, the transparent micro-LED pixel circuit according to the first embodiment may control the voltage to be applied to each of the first low-potential power line EVSS_R, the second low-potential power line EVSS_G, and the third low-potential power line EVSS_B such that one driving transistor DR-TFT may allow the first micro-LED uLED_R, the second micro-LED uLED_G, and the third micro-LED uLED_B to emit light.

Since the transparent micro-LED pixel circuit according to the first embodiment can drive the first micro-LED uLED_R, the second micro-LED uLED_G, and the third micro-LED uLED_B using one driving transistor DR-TFT, the area size of the transmissive area of the transparent display panel may be increased, and thus the transparency thereof may be improved.

Each of the first micro-LED uLED_R, the second micro-LED uLED_G, and the third micro-LED uLED_B may be embodied as a light-emitting diode (LED) element made of an inorganic material or the like. Because the LED element made of the inorganic material has high light conversion efficiency, the LED element consumes very little energy, has a semi-permanent lifespan, and is environmentally friendly.

Figure 6:
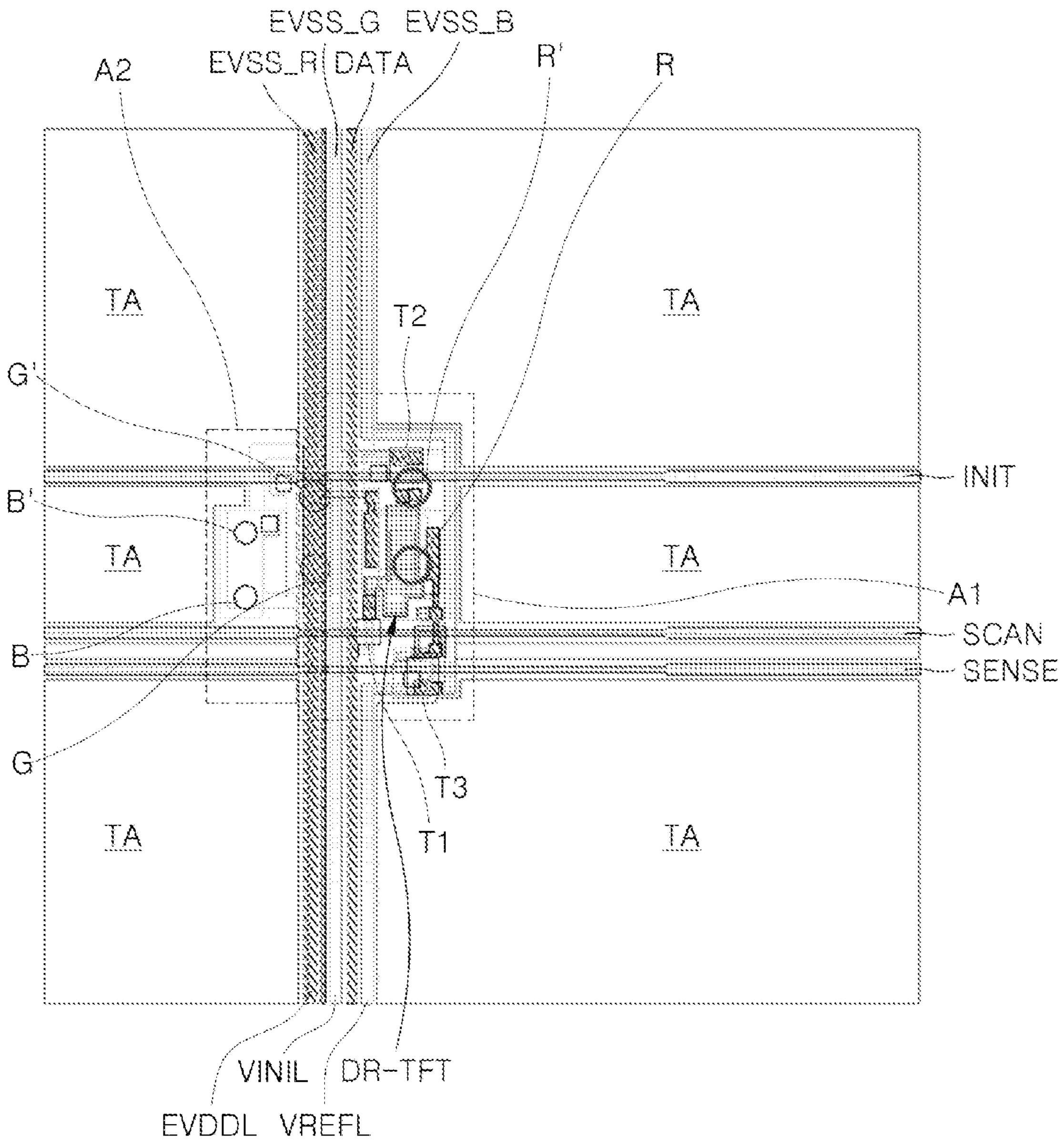
FIG. 6 shows a layout of the unit pixel circuit according to the first embodiment.

FIG. 6 shows a layout of the unit pixel circuit according to the first embodiment.

Referring to FIG. 4 to FIG. 6, in order to increase the area size of the transmissive area TA, the three micro-LED uLED elements are driven by one driving transistor DR-TFT, and a voltage applied to the power line of each sub-pixel may be controlled to drive the R, G, B micro-LED uLED elements in a time division manner (for example, 33%).

The unit pixel circuit according to the first embodiment requires the first low-potential power line EVSS_R, the second low-potential power line EVSS_G, and the third low-potential power line EVSS_B, whereas the number of the thin-film transistors of the unit pixel circuit can be reduced from 12 to 4, and the number of the data lines may be reduced from three to one, thereby increasing the area size of the transmissive area TA. Thus, the transparency thereof may also be improved from 65% to 72%.

Referring to FIG. 6, the first micro-LED uLED_R may be disposed on the pixel circuit. The second micro-LED uLED_G may be disposed on the first low-potential power line EVSS_R such that at least a portion thereof overlaps with the first low-potential power line EVSS_R. The third micro-LED uLED_B may be independently disposed on one side of the first low-potential power line EVSS_R. The third micro-LED uLED_B may not overlap with the driving transistor DR-TFT.

In an embodiment, the first low-potential power line EVSS_R, the second low-potential power line EVSS_G, and the third low-potential power line EVSS_B may extend in the Y-axis direction in a plan view of the display panel. In one example, the third low-potential power line EVSS_B may extend so as to surround at least 3 sides of the pixel circuit. A side of the pixel circuit not surrounded with the third low-potential power line EVSS_B may be adjacent to the data line.

Further, the high-potential power line, the initialization power line, the reference voltage power line, and the data line may extend in the Y-axis direction in a plan view of the display panel. In one example, each of the high-potential power line, the initialization power line, the reference voltage power line, and the data line DATA may overlap with at least one of the first low-potential power line EVSS_R, the second low-potential power line EVSS_G, and the third low-potential power line EVSS_B. Alternatively, each of the high-potential power line, the initialization power line, the reference voltage power line, and the data line may be interposed between adjacent ones of the first low-potential power line EVSS_R, the second low-potential power line EVSS_G, and the third low-potential power line EVSS_B, and may extend in a parallel manner to the first low-potential power line EVSS_R, the second low-potential power line EVSS_G, and the third low-potential power line EVSS_B.

Further, the initialization line to which the initialization signal INIT is applied, the scan line to which the scan signal SCAN is applied, and the sense line to which the sensing signal SENSE is applied may extend in the X-axis direction in a plan view of the display panel. In one example, the initialization line may be spaced apart from and extend parallel to the scan line and the sense line while the driving transistor DR-TFT is interposed between the initialization line and the scan line and the sense line.

In an embodiment, the pixel circuit and the micro-LED uLED elements R, G, and B may be disposed in a circuit area A1 and a redundant area A2. The driving transistor DR-TFT, the first transistor T1, the second transistor T2, and the third transistor T3 may be disposed in the circuit area A1. The data line DATA may be disposed between adjacent two of the first low-potential power line EVSS_R, the second low-potential power line EVSS_G, and the third low-potential power line EVSS_B. The first micro-LED R and the second micro-LED G may be disposed in the circuit area A1. In this case, the first micro-LED R and the second micro-LED G may be disposed on other components in the circuit area A1, for example, the driving transistor DR-TFT, the first transistor T1, and the first low-potential power line EVSS_R. However, this is only an example and the present disclosure is not limited thereto.

The third micro-LED B may be disposed in the redundant area A2. The third micro-LED B may be disposed in the redundant area A2, but may be electrically connected to other components included in the circuit area A1. The third micro-LED B may be disposed in the same layer as a layer in which the first micro-LED R and the second micro-LED G are disposed. However, the present disclosure is not limited thereto.

In an embodiment, the sizes of the first micro-LED R, the second micro-LED G, and the third micro-LED B may be distinguished from each other. For example, the size of the first micro-LED R may be larger than that of the second micro-LED G. In another example, the size of the second micro-LED G may be greater than that of the third micro-LED B.

In an embodiment, a first redundant micro-LED R', a second redundant micro-LED G', and a third redundant micro-LED B' may be further disposed in the circuit area A1 and the redundant area A2. The first redundant micro-LED R', the second redundant micro-LED G' and the third redundant micro-LED B' may respectively replace the first micro-LED R, the second micro-LED G and the third micro-LED B when the first micro-LED R, the second micro-LED G and the third micro-LED B are defective.

For example, the first redundant micro-LED R' and the first micro-LED R may be arranged in a line along the y-axis direction. Thus, when the first micro-LED R is defective, the first redundant micro-LED R' instead of the first micro-LED R may be connected to the pixel circuit. The first redundant micro-LED R' may have the same configuration as that of the first micro-LED R. For example, the first redundant micro-LED R' may have the same size and configuration as those of the first micro-LED R.

The second redundant micro-LED G' and the second micro-LED G may be arranged in a line along the y-axis direction. Thus, when, the second micro-LED G is defective, the second redundant micro-LED G' in place of the second micro-LED G may be connected to the pixel circuit. The second redundant micro-LED G' may have the same configuration as that of the second micro-LED G. For example, the second redundant micro-LED G' may have the same size and configuration as those of the second micro-LED G.

The third redundant micro-LED B' and the third micro-LED B may be arranged in a line along the y-axis direction. Thus, when the third micro-LED B is defective, the third redundant micro-LED B' in place of the third micro-LED B may be connected to the pixel circuit. The third redundant micro-LED B' may have the same configuration as that of the third micro-LED B. For example, the third redundant micro-LED B' may have the same size and configuration as those of the third micro-LED B.

In FIG. 6, a configuration in which the first redundant micro-LED R' and the first micro-LED R are arranged in a line along the y-axis direction, the second redundant micro-LED G' and the second micro-LED G are arranged in a line along the y-axis direction, and the third redundant micro-LED B' and the third micro-LED B are arranged in a line along the y-axis direction is illustrated by way of example. However, the present disclosure is not limited thereto. The first redundant micro-LED R' and the first micro-LED R may be arranged in a line along the x-axis direction, the second redundant micro-LED G' and the second micro-LED G may be arranged in a line along the x-axis direction, and the third redundant micro-LED B' and the third micro-LED B may be arranged in a line along the x-axis direction (see FIG. 8). Alternatively, the arrangement thereof may vary.

Figure 7:
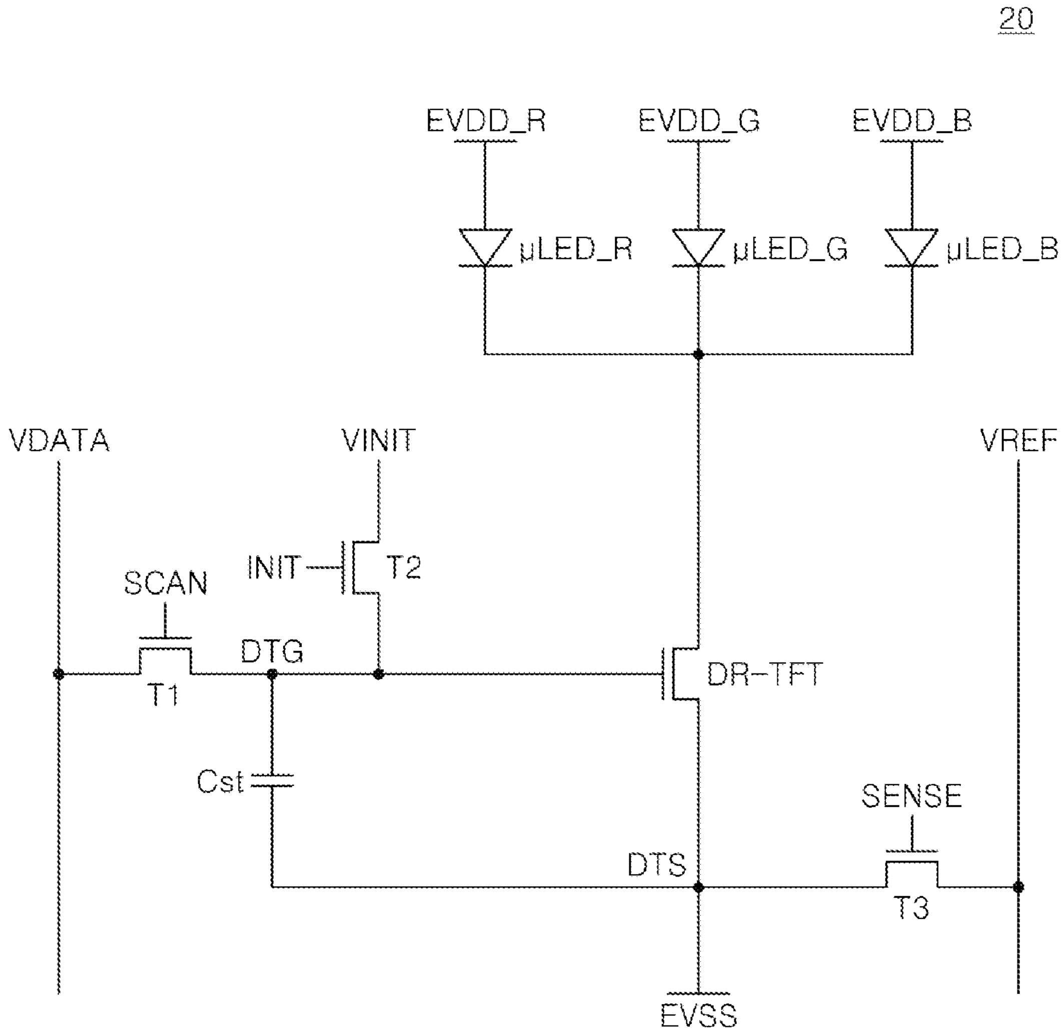
FIG. 7 shows a unit pixel circuit according to a second embodiment.
Figure 8:
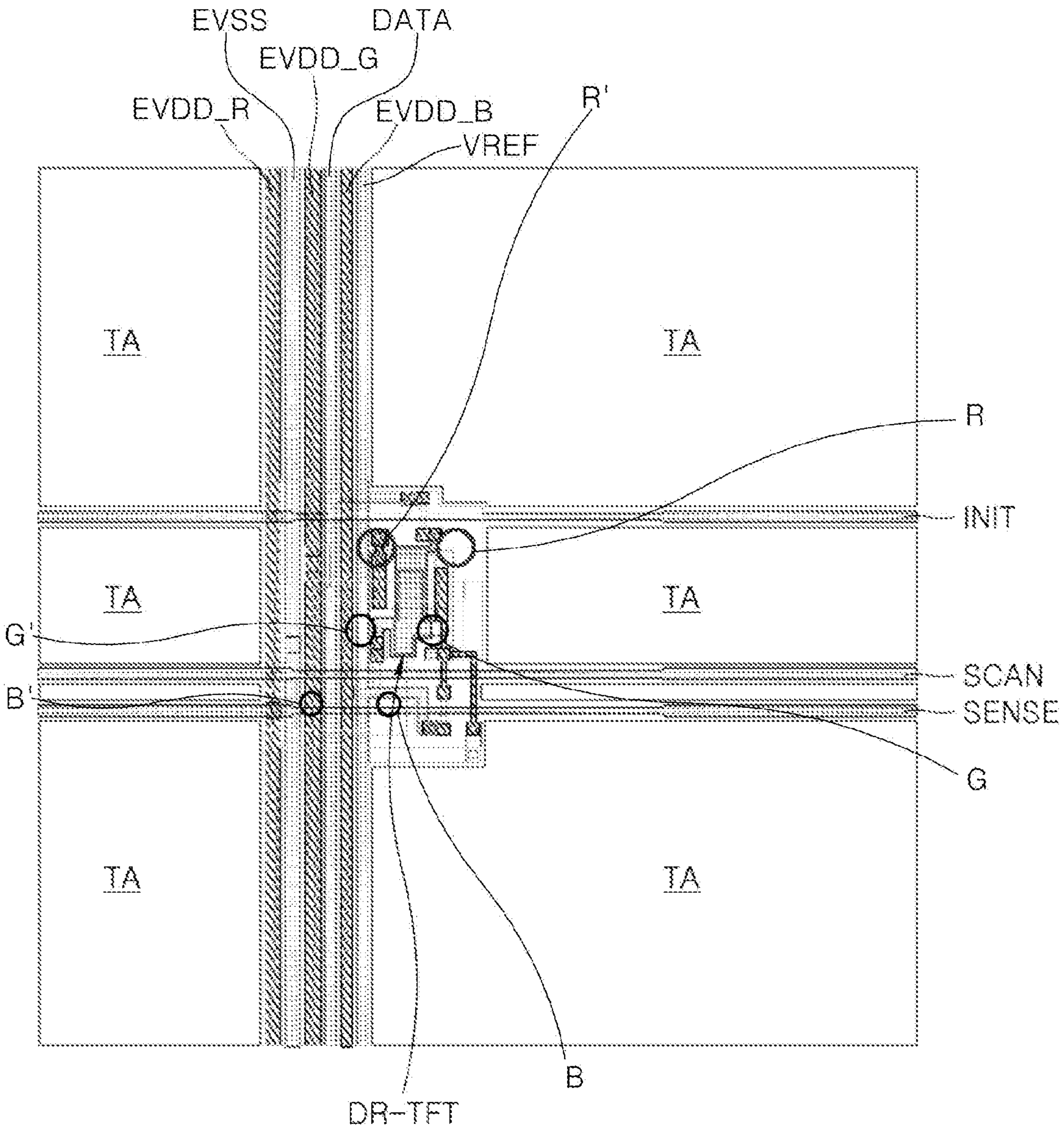
FIG. 8 shows a layout of the unit pixel circuit according to the second embodiment.

FIG. 7 shows a unit pixel circuit according to a second embodiment. FIG. 8 shows a layout of the unit pixel circuit according to the second embodiment. The description of FIG. 8 duplicate with those of FIG. 6 may be omitted.

Referring to FIG. 7 and FIG. 8, the unit pixel circuit 20 according to the second embodiment includes the first micro-LED uLED_R, the second micro-LED uLED_G, the third micro-LED uLED_B, the driving transistor DR-TFT, the storage capacitor Cst, the first transistor T1, the second transistor T2 and the third transistor T3.

Each of the first micro-LED uLED_R, the second micro-LED uLED_G, and the third micro-LED uLED_B emits light based on the driving current.

The cathode electrode of the first micro-LED uLED_R is connected to the drain electrode of the driving transistor DR-TFT, and the anode electrode thereof is connected to the first high-potential power line EVDD_R.

The cathode electrode of the second micro-LED uLED_G is connected to the drain electrode of the driving transistor DR-TFT, and the anode electrode thereof is connected to the second high-potential power line EVDD_G.

The cathode electrode of the third micro-LED uLED_B is connected to the drain electrode of the driving transistor DR-TFT, and the anode electrode thereof is connected to the third high-potential power line EVDD_B.

The low-potential voltage EVSS or the high-potential voltage EVDD may be applied to the first high-potential power line EVDD_R to the third high-potential power line EVDD_B.

In one example, when the display device allows the first micro-LED uLED_R to emit light, the high-potential voltage EVDD may be applied to the first high-potential power line EVDD_R, while the low-potential voltage EVSS may be applied to the second high-potential power line EVDD_G and the third high-potential power line EVDD_B.

In one example, when the display device allows the second micro-LED uLED_G to emit light, the high-potential voltage EVDD may be applied to the second high-potential power line EVDD_G, while the low-potential voltage EVSS may be applied to the first high-potential power line EVDD_R and the third high-potential power line EVDD_B.

In one example, when the display device allows the third micro-LED uLED_B to emit light, the high-potential voltage EVDD may be applied to the third high-potential power line EVDD_B, while the low-potential voltage EVSS may be applied to the first high-potential power line EVDD_R and the second high-potential power line EVDD_G.

The driving transistor DR-TFT controls the driving current and is disposed between and connected to the cathode electrodes of the first micro-LED uLED_R, the second micro-LED uLED_G, and the third micro-LED uLED_B and the low-potential power line to which the low-potential voltage EVSS is applied. The driving transistor DR-TFT includes the source electrode corresponding to the node DTS, the gate electrode corresponding to the node DTG, and the drain electrode connected to the cathode electrodes of the first micro-LED uLED_R, the second micro-LED uLED_G, and the third micro-LED uLED_B.

The storage capacitor Cst is disposed between and connected to the gate electrode and the source electrode of the driving transistor DR-TFT. The storage capacitor Cst may sample the data voltage $V_{DATA}$ when the first transistor T1 is turned on, and may boost the gate electrode of the driving transistor DR-TFT.

The first transistor T1 is disposed between and connected to the data line to which the data voltage $V_{DATA}$ is applied and the gate electrode of the driving transistor DR-TFT. Further, the first transistor T1 is disposed between and connected to the data line and one electrode of the storage capacitor Cst. The first transistor T1 transmits the data voltage $V_{DATA}$ to the node DTG in response to the scan signal SCAN.

The second transistor T2 is disposed between and connected to the initialization power line to which the initialization voltage VINIT is applied and the node DTG. The second transistor T2 initializes the node DTG corresponding to the gate electrode of the driving transistor DR-TFT in response to the initialization signal INIT.

The third transistor T3 is disposed between and connected to the reference power line to which the reference voltage VREF is applied and the node DTS.

The third transistor T3 precharges the node DTS corresponding to the source electrode of the driving transistor DR-TFT with the reference voltage VREF in response to the sensing signal SENSE.

Each of the driving transistor DR-TFT, the first transistor T1, the second transistor T2, and the third transistor T3 may be embodied as an NMOS transistor.

In this way, the transparent micro-LED pixel circuit according to the second embodiment controls the voltage applied to each of the first high-potential power line EVDD_R, the second high-potential power line EVDD_G, and the third high-potential power line EVDD_B such that one driving transistor DR-TFT allows each of the first micro-LED uLED_R, the second micro-LED uLED_G, and the third micro-LED uLED_B to emit light.

The transparent micro-LED pixel circuit according to the second embodiment may drive the first micro-LED uLED_R, the second micro-LED uLED_G, and the third micro-LED uLED_B using one driving transistor DR-TFT, such that the area size of the transmissive area of the transparent display panel may be increased, and thus the transparency thereof may be improved.

Referring to FIG. 8, the first micro-LED uLED_R may be disposed on the pixel circuit. The second micro-LED uLED_G may be spaced apart from the first micro-LED uLED_R and may be disposed on the pixel circuit. The third micro-LED uLED_B may be disposed to overlap the third scan signal to which the sensing signal SENSE is applied.

In an embodiment, the first high-potential power line EVDD_R, the second high-potential power line EVDD_G, and the third high-potential power line EVDD_B may extend in the Y-axis direction in a plan view of the display panel. In one example, the first high-potential power line EVDD_R, the second high-potential power line EVDD_G, and the third high-potential power line EVDD_B may be spaced apart from each other and may extend in parallel to each other.

Further, the high-potential power line, the initialization power line, the reference voltage power line, and the data line may extend in the Y-axis direction in a plan view of the display panel. In one example, each of the low-potential power line, the initialization power line, the reference voltage power line, and the data line DATA may be interposed between adjacent ones of the first high-potential power line EVDD_R, the second high-potential power line EVDD_G, and the third high-potential power line EVDD_B, and may extend in a parallel manner to the first high-potential power line EVDD_R, the second high-potential power line EVDD_G, and the third high-potential power line EVDD_B. Alternatively, each of the low-potential power line, the initialization power line, the reference voltage power line, and the data line may overlap at least one of the first high-potential power line EVDD_R, the second high-potential power line EVDD_G, and the third high-potential power line EVDD_B.

Further, the initialization line to which initialization signal INIT is applied, the scan line to which the scan signal SCAN is applied, and the sense line to which the sensing signal SENSE is applied may extend in the X-axis direction in a plan view of the display panel. In one example, the initialization line may be spaced apart from and extend parallel to the scan line and the sense line while the driving transistor DR-TFT is interposed therebetween.

In an embodiment, FIG. 8 may represent an example in which the redundant area A2 of FIG. 6 is omitted. In this case, the pixel circuit and the micro-LEDs R, G, and B may be disposed in the pixel area.

Figure 9:
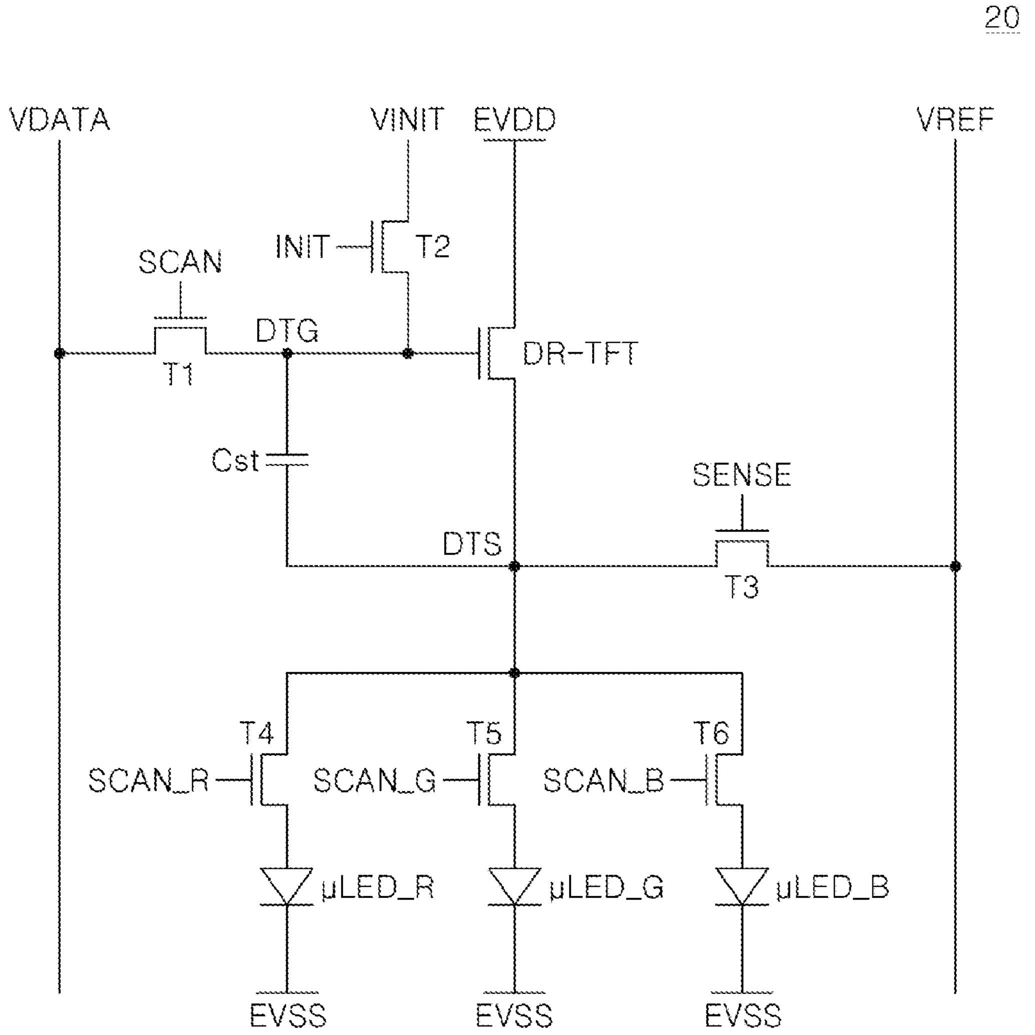
FIG. 9 shows a unit pixel circuit according to a third embodiment.

FIG. 9 shows a unit pixel circuit according to a third embodiment.

Referring to FIG. 9, the unit pixel circuit 20 according to the third embodiment includes the first micro-LED uLED_R, the second micro-LED uLED_G, the third micro-LED uLED_B, a first scan transistor T4, a second scan transistor T5, a third scan transistor T6, the driving transistor DR-TFT, the storage capacitor Cst, the first transistor T1, the second transistor T2 and the third transistor T3.

Each of the first micro-LED uLED_R, the second micro-LED uLED_G, and the third micro-LED uLED_B emit light based on the driving current.

The first scan transistor T4 is disposed between and connected to the anode electrode of the first micro-LED uLED_R and the source electrode of the driving transistor DR-TFT. The first scan transistor T4 generates a current path between the driving transistor DR-TFT and the first micro-LED uLED_R in response to a first scan signal SCAN_R.

The second scan transistor T5 is disposed between and connected to the anode electrode of the second micro-LED uLED_G and the source electrode of the driving transistor DR-TFT. The second scan transistor T5 generates a current path between the driving transistor DR-TFT and the second micro-LED uLED_G in response to a second scan signal SCAN_G.

The third scan transistor T6 is disposed between and connected to the anode electrode of the third micro-LED uLED_B and the source electrode of the driving transistor DR-TFT. The third scan transistor T6 generates a current path between the driving transistor DR-TFT and the third micro-LED uLED_B in response to a third scan signal SCAN_B.

The first micro-LED uLED_R is disposed between and connected to the first scan transistor T4 and the low-potential power line to which the low-potential voltage EVSS is applied. The second micro-LED uLED_G is disposed between and connected to the second scan transistor T5 and the low-potential power line to which the low-potential voltage EVSS is applied. The third micro-LED uLED_B is disposed between and connected to the third scan transistor T6 and the low-potential power line to which the low-potential voltage EVSS is applied.

In one example, when the display device allows the first micro-LED uLED_R to emit light, the display device may enable the first scan signal SCAN_R. When the display device allows the second micro-LED uLED_G to emit light, the display device may enable the second scan signal SCAN_G. When the display device allows the third micro-LED to emit light, the display device may enable the third scan signal SCAN_B.

The driving transistor DR-TFT controls the driving current and is disposed between and connected to each of the first scan transistor T4, the second scan transistor T5, and the third scan transistor T5 and the high-potential power line to which the high-potential voltage EVDD is applied.

The storage capacitor Cst is disposed between and connected to the gate electrode and the source electrode of the driving transistor DR-TFT. The storage capacitor Cst may sample the data voltage $V_{DATA}$ when the first transistor T1 is turned on, and may boost the gate electrode of the driving transistor DR-TFT.

The first transistor T1 is disposed between and connected to the data line to which the data voltage $V_{DATA}$ is applied and the gate electrode of the driving transistor DR-TFT. Further, the first transistor T1 is disposed between and connected to the data line and one electrode of the storage capacitor Cst. The first transistor T1 transmits the data voltage $V_{DATA}$ to the node DTG in response to the scan signal SCAN.

The second transistor T2 is disposed between and connected to the initialization power line to which the initialization voltage VINIT is applied and the node DTG. The second transistor T2 initializes the node DTG corresponding to the gate electrode of the driving transistor DR-TFT in response to the initialization signal INIT.

The third transistor T3 is disposed between and connected to the reference power line to which the reference voltage VREF is applied and the node DTS. The third transistor T3 precharges the node DTS corresponding to the source electrode of the driving transistor DR-TFT with the reference voltage VREF in response to the sensing signal SENSE.

In this way, the transparent micro-LED pixel circuit according to the third embodiment controls the first scan signal SCAN_R, the second scan signal SCAN_G, and the third scan signal SCAN_B respectively applied to the first scan transistor T4, the second scan transistor T5, and the third scan transistor T5 such that one driving transistor DR-TFT allows the one of the first micro-LED uLED_R, the second micro-LED uLED_G, and the third micro-LED uLED_B to emit light.

Thus, the transparent micro-LED pixel circuit according to the third embodiment may drive the first micro-LED uLED_R, the second micro-LED uLED_G, and the third micro-LED uLED_B using one driving transistor DR-TFT, such that the area size of the transmissive area of the transparent display panel may be increased, and thus the transparency thereof may be improved.

Figure 10:
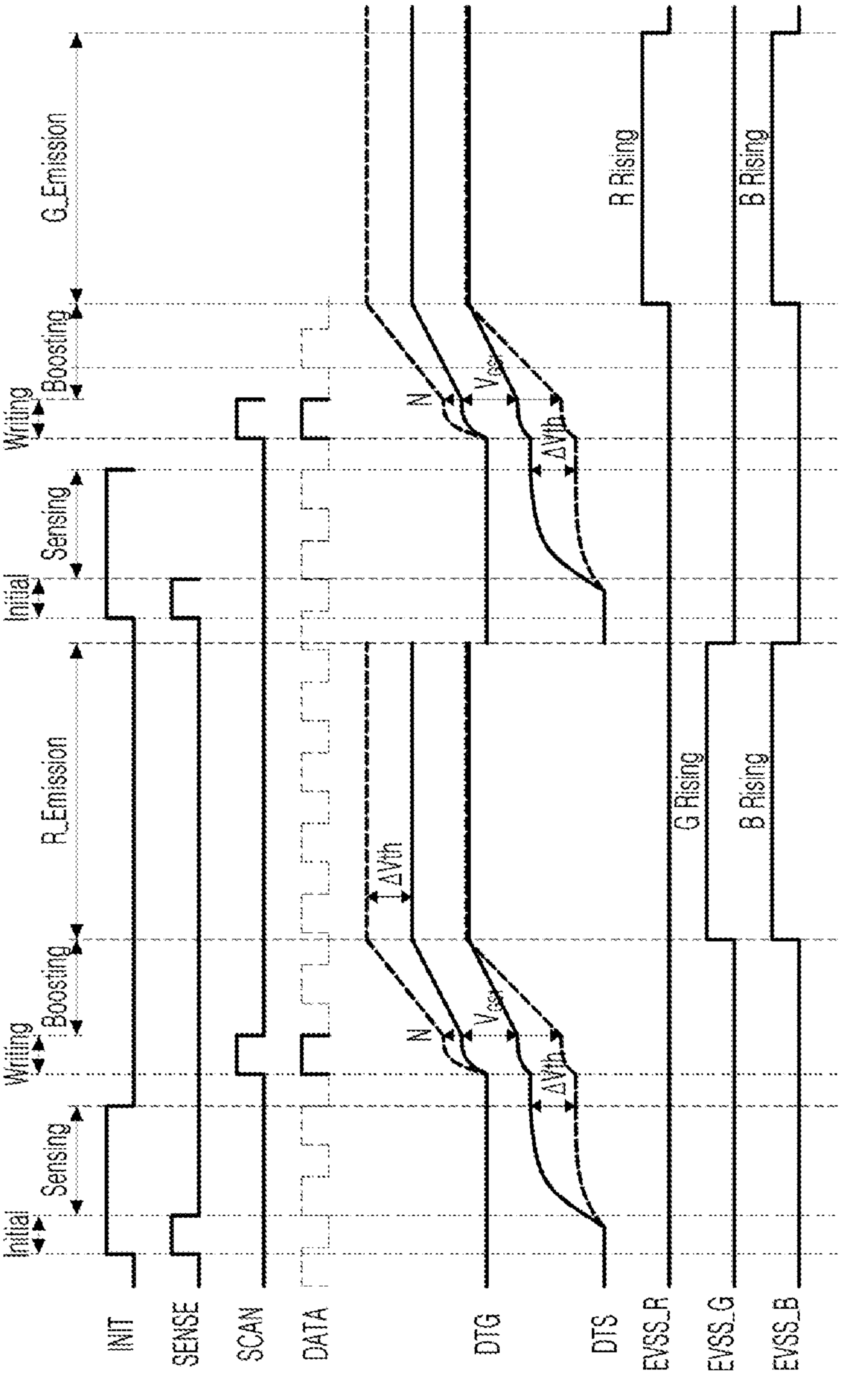
FIG. 10 shows a timing chart of a transparent micro-LED display device to which a unit pixel circuit according to the first embodiment is applied.

FIG. 10 shows a timing chart of a transparent micro-LED display device to which a unit pixel circuit according to the first embodiment is applied.

Referring to FIG. 5 and FIG. 10, an operation period of the transparent micro-LED display device may be divided into an initialization period, a sensing period, a writing period, a boosting period, and an emission period.

During the initialization period, the second transistor T2 applies the initialization voltage VINI to the gate electrode of the driving transistor DR-TFT in response to the initialization signal INIT. The third transistor T3 applies the reference voltage VREF to the source electrode of the driving transistor DR-TFT in response to the sensing signal SENSE.

During the sensing period, the third transistor T3 is turned off, and a voltage level of the source electrode of the driving transistor DR-TFT rises according to the threshold voltage Vth of the driving transistor. In one example, the sensing period may be set to 200 us or larger.

During the writing period, the first transistor T1 transfers the data voltage $V_{DATA}$ to the storage capacitor Cst in response to the scan signal SCAN, and writes the data voltage $V_{DATA}$ thereto.

During the boosting period, the first transistor T1 is turned off, and the voltage level of each of the gate electrode and the source electrode of the driving transistor DR-TFT is boosted according to the gate-source voltage $V_{GS1}$. In one example, the characteristics of the driving transistor may be compensated for in real time during the boosting period. For example, a difference between the threshold voltages of the driving transistors of the unit pixel circuits may be compensated for.

During the emission period, the device applies the low-potential voltage EVSS to the first low-potential power line EVSS_R and applies the high-potential voltage EVDD to the second low-potential power line EVSS_G and the third low-potential power line EVSS_B, such that the first micro-LED uLED_R emits light.

Further, during the emission period, the device applies the low-potential voltage EVSS to the second low-potential power line EVSS_G, and applies the high-potential voltage EVDD to the first low-potential power line EVSS_R and the third low-potential power line EVSS_B, such that the second micro-LED uLED_G emits light.

Further, during the emission period, the device applies the low-potential voltage EVSS to the third low-potential power line EVSS_B, and applies the high-potential voltage EVDD to the first low-potential power line EVSS_R and the second low-potential power line EVSS_G, such that the third micro-LED uLED_B emits light.

Figure 11:
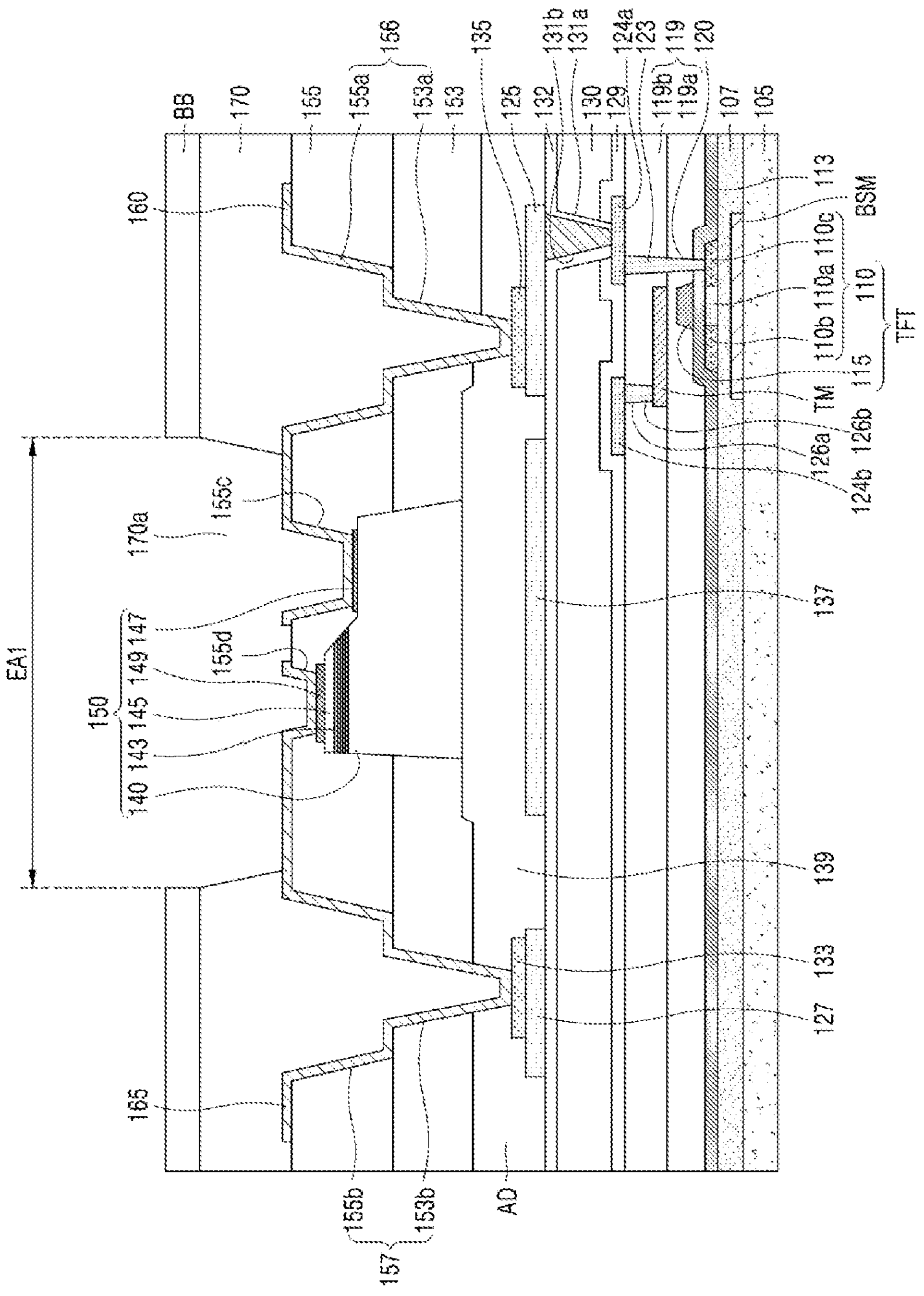
FIG. 11 is a cross-sectional view of the pixel circuit of FIG. 6 as taken along one direction.

FIG. 11 is a cross-sectional view of the pixel circuit of FIG. 6 as cut along one direction.

Referring to FIG. 11, a thin-film transistor TFT is disposed on a substrate 105. The thin-film transistor TFT may include a semiconductor layer 110 formed on the substrate 105, a gate electrode 115 located on the semiconductor layer 110, and a gate insulating layer 113 located between the semiconductor layer 110 and the gate electrode 115 and formed over an entire area of the substrate 105 to cover the semiconductor layer 110. A buffer insulating layer 107 may be disposed between the substrate 105 and the semiconductor layer 110. A light-blocking layer BSM is disposed on the buffer insulating layer 107. The light-blocking layer BSM may reduce leakage current by preventing light incident from a position under the substrate 105 from entering the semiconductor layer 110 of the thin-film transistor TFT. For example, when light is irradiated to the semiconductor layer 110, leakage current may occur, and thus, reliability of the thin-film transistor TFT may deteriorate. Therefore, the reliability of the thin-film transistor TFT may be improved by disposing the light-blocking layer BSM on the substrate 105. The light-blocking layer BSM may include a non-transparent conductive material.

The substrate 105 may be made of a transparent material including glass or plastic. The semiconductor layer 110 may include an active area 110*a* overlapping the gate electrode 115 to constitute a channel, and a source area 110*b* and a drain area 110*c* respectively located on both opposing sides of the active area 110*a* interposed therebetween.

A first interlayer insulating film 119*a* is disposed on the gate electrode 115. A capacitor electrode TM may be disposed on the first interlayer insulating film 119*a* so as to overlap the gate electrode 115. The storage capacitor Cst may be composed of the capacitor electrode TM, the gate electrode 115, and a portion of the first interlayer insulating film 119*a* disposed between the capacitor electrode TM and the gate electrode 115 as a dielectric layer. A second interlayer insulating film 119*b* may be disposed on the first interlayer insulating film 119*a*. Thus, an interlayer insulating film 119 including the first and second interlayer insulating films 119*a* and 119*b* may be formed.

The interlayer insulating film 119 may have a drain contact-hole 120 defined therein extending through the second interlayer insulating film 119*b*, the first interlayer insulating film 119*a*, and the gate insulating layer 113 so as to expose a portion of the drain area 110*c* of the semiconductor layer 110. The drain contact-hole 120 may be filled with a conductive material or a metal material to form a drain contact 123 electrically connected to the drain area 110*c*. Further, the interlayer insulating film 119 may have a source contact-hole 126*a* defined therein extending through the second interlayer insulating film 119*b* so as to expose a portion of a surface of the capacitor electrode TM. The source contact-hole 126*a* may be filled with a conductive material or a metal material to form a source contact 126*b* electrically connected to the capacitor electrode TM. The capacitor electrode TM may be connected to another switching thin-film transistor.

A drain electrode 124*a* and a source electrode 124*b* may be disposed on the second interlayer insulating film 119*b*. The drain electrode 124*a* may be electrically connected to the thin-film transistor TFT via the drain contact 123. The source electrode 124*b* may be electrically connected to the capacitor electrode TM via the source contact 126*b*. The drain electrode 124*a* and the source electrode 124*b* may be positioned in the same plane.

A first protection layer 129 may be disposed on the second interlayer insulating film 119*b* including the drain electrode 124*a* and the source electrode 124*b*. The first protection layer 129 may include an insulating material. A first insulating layer 130 is disposed on the first protection layer 129. The first insulating layer 130 may include a positive type photoactive compound (PAC). The positive type photoactive compound includes a material in which a decomposition reaction occurs in an exposed portion thereof to light such that the solubility of the exposed portion increases.

The first insulating layer 130 and the first protection layer 129 may have an opening 131*a* defined therein that selectively exposes an upper surface of the drain electrode 124*a* while the first insulating layer 130 and the first protection layer 129 cover the source electrode 124*b*. A second protection layer 132 including an insulating material may be disposed on the first insulating layer 130 and an exposed surface of the opening 131*a*. A via contact 131*b* may fill the opening 131*a*.

A connection electrode 125, a reflective layer 137, and a common voltage line 127 may be disposed on the via contact 131*b* and the second protection layer 132. The common voltage line 127 may be spaced apart from the data line and may extend in parallel therewith. The connection electrode 125, the reflective layer 137, and the common voltage line 127 may be disposed in the same plane. However, the present disclosure is not limited thereto. The connection electrode 125, the reflective layer 137, and the common voltage line 127 may be disposed in different layers.

Conductive pads 133 and 135 respectively connected to the common voltage line 127 and the connection electrode 125 may be disposed. Each of the conductive pads 133 and 135 may include a conductive material or a metal material. The conductive pads 133 and 135 may include the first conductive pad 133 connected to the common voltage line 127 and the second conductive pad 135 connected to the connection electrode 125.

The reflective layer 137 is positioned on the second protection layer 132 and has a flat plate shape. The reflective layer 137 serves to reflect light beams directed toward the substrate 105 among light beams emitted from the micro-LED 150 toward a light-emitting area EA1. The reflective layer 137 may include, but is not limited to, a metal material having high reflectivity.

An adhesive layer AD may be disposed on the connection electrode 125, the reflective layer 137, and the common voltage line 127. The adhesive layer AD is a layer for bonding a micro-LED 150 onto the reflective layer 137. The adhesive layer AD may insulate the reflective layer 137 made of the metal material from the micro-LED 150. The adhesive layer AD may be made of a heat curable material or a light curable material. However, the present disclosure is not limited thereto. In one example, FIG. 3 shows that the adhesive layer AD is disposed over an entirety of a top surface of the substrate 105. However, the present disclosure is not limited thereto. The adhesive layer AD may be disposed only in a partial area overlapping the reflective layer 137. However, the present disclosure is not limited thereto.

The micro-LED 150 is disposed on the adhesive layer AD. The micro-LED 150 may be positioned where the plate-shaped reflective layer 137 is disposed. The micro-LED 150 may include a first semiconductor layer 140, an active layer 143 disposed on one side of a top surface of the first semiconductor layer 140, a second semiconductor layer 145 disposed on the active layer, a first pad electrode 147 disposed on the other side of the top surface of the first semiconductor layer 140 on which the active layer 143 is not located, and a second pad electrode 149 disposed on the second semiconductor layer 145.

The first semiconductor layer 140 may be a layer for supplying electrons to the active layer 143, and may include a nitride semiconductor including the first conductivity type impurities. For example, the first conductivity-type impurity may include an N-type impurity. The nitride semiconductor may be made of a GaN-based semiconductor material including GaN, AlGaN, InGaN, or AlInGaN. The N-type impurities contained in the first semiconductor layer 140 may include silicon (Si), germanium (Ge), selenium (Se), or carbon (C). The first semiconductor layer 140 may further include an undoped nitride semiconductor layer (undoped GaN) as a lower portion thereof.

The active layer 143 disposed on one side of the top surface of the first semiconductor layer 140 may be a layer for emitting light, and may have a multi-quantum well (MQW) structure having a well layer and a barrier layer having a higher band gap than that of the well layer. For example, the active layer 143 may include an InGaN layer as the well layer and an AlGaN layer as the barrier layer.

The second semiconductor layer 145 is formed on the active layer 143 and is a layer for injecting holes into the active layer 143. The second semiconductor layer 145 may include a nitride semiconductor including the second conductivity type impurity. For example, the second conductivity type impurity may include a P type impurity. The nitride semiconductor may be made of a GaN-based semiconductor material including GaN, AlGaN, InGaN, or AlInGaN. The P-type impurity contained in the second semiconductor layer 145 may include manganese (Mg), zinc (Zn), or beryllium (Be). In the present disclosure, an example in which the first semiconductor layer 140 and the second semiconductor layer 145 include a nitride semiconductor containing the N-type impurities and a nitride semiconductor containing the P-type impurities, respectively, is described. However, the present disclosure is not limited thereto. In another example, the first semiconductor layer 140 and the second semiconductor layer 145 may include a nitride semiconductor containing the P-type impurity and a nitride semiconductor containing the N-type impurity, respectively.

Each of the first pad electrode 147 and the second pad electrode 149 may be made of a material including at least one of a metal material such as Au, W, Pt, Si, Ir, Ag, Cu, Ni, Ti, or Cr, and an alloy thereof.

The active layer 143 may emit light based on recombination of electrons and holes respectively supplied from the first semiconductor layer 140 and the second semiconductor layer 145.

The micro-LED 150 may be covered with a second insulating layer 153 and a third insulating layer 155. The second insulating layer 153 and the third insulating layer 155 may include the same material, and may include, for example, a positive type photoactive material.

The adhesive layer AD, the second insulating layer 153 and the third insulating layer 155 may have a first contact-hole 156 including a first via-hole 153*a* and a second via-hole 155*a*, and a second contact-hole 157 including a first via-hole 153*b* and a second via-hole 155*b* defined therein so as to expose the first conductive pad 133 and the second conductive pad 135, respectively. Further, a first pad contact-hole 155*c* and a second pad contact-hole 155*d* are defined in the third insulating layer 155 so as to expose a portion of an upper surface of the first pad electrode 147 and a portion of an upper surface of the second pad electrode 149 of the micro-LED 150, respectively.

A first electrode 160 and a second electrode 165 are positioned on the third insulating layer 155 so as to be electrically connected to the drain electrode 124*a* of the thin-film transistor TFT and the common voltage line 127, respectively. The first electrode 160 may be connected to the portion of the first pad electrode 147 exposed through the first pad contact-hole 155*c* and may extend along and on the exposed surface of the first contact-hole 156 so as to be electrically connected to the thin-film transistor TFT via the second conductive pad 135 and the connection electrode 125 connected to the second conductive pad 135 and the drain electrode 124*a*. In this regard, the first electrode 160 may also be referred to as a cathode electrode.

The second electrode 165 may be connected to the second pad electrode 149 exposed through the second pad contact-hole 155*d* and may extend along and on the exposed surface of the second contact-hole 157 so as to be electrically connected to the first conductive pad 135 and the common voltage line 127 connected to the first conductive pad 135. The second electrode 165 may also be referred to as an anode electrode.

The first electrode 160 and the second electrode 165 may be made of the same material including a transparent metal oxide such as indium-tin-oxide (ITO) or indium-zinc-oxide (IZO).

A bank 170 having a bank-hole 170*a* defined therein is disposed on the third insulating layer 155 on which the first electrode 160 and the second electrode 165 have been formed. The bank 170 may be a boundary area defining the light-emitting area EA1 and plays a role in defining each sub-pixel. Further, the bank 170 acts as a partitioning wall to prevent the light beams of different colors from adjacent different pixels from being mixed with each other. The first contact-hole 156 and the second contact-hole 157 on which the first electrode 160 and the second electrode 165 are respectively formed may be filled with a material constituting the bank 170. On the bank 170, a black bank BB including a non-transparent material may be disposed.

The micro-LED 150 may be electrically connected to the driving thin-film transistor TFT via the first electrode 160 and may be electrically connected to the common voltage line 127 via the second electrode 165 and thus may emit light.

Since the unit pixel circuit of the transparent micro-LED according to the embodiments may emit red, green, and blue micro-LEDs using one driving transistor, the area size of the transmissive area of the transparent display panel may be increased, and the transparency thereof may be improved.

A first aspect of the present disclosure provides a transparent micro-LED unit pixel circuit comprising: a first micro-LED, a second micro-LED and a third micro-LED configured to emit light based on a driving current; a driving transistor configured to control the driving current, wherein the driving transistor is connected between a high-potential power line and an anode electrode of each of the first micro-LED, the second micro-LED, and the third micro-LED; a storage capacitor connected between a gate electrode and a source electrode of the driving transistor; and a first transistor configured to apply a data voltage to the gate electrode of the driving transistor.

In some implementations of the first aspect, a first power line is connected to a cathode electrode of the first micro-LED, a second power line is connected to a cathode electrode of the second micro-LED, and a third power line is connected to a cathode electrode of the third micro-LED.

In some implementations of the first aspect, when the first micro-LED is selected to emit light, a low-potential voltage is applied to the first power line, while a high-potential voltage is applied to the second and third power lines, wherein when the second micro-LED is selected to emit light, the low-potential voltage is applied to the second power line, while the high-potential voltage is applied to the first and third power lines, wherein when the third micro-LED is selected to emit light, the low-potential voltage is applied to the third power line, while the high-potential voltage is applied to the first and second power lines.

In some implementations of the first aspect, the transparent micro-LED unit pixel circuit further comprises a second transistor configured to apply an initialization voltage to the gate electrode of the driving transistor.

In some implementations of the first aspect, the transparent micro-LED unit pixel circuit further comprises a third transistor configured to apply a reference voltage to the source electrode of the driving transistor.

A second aspect of the present disclosure provides a transparent micro-LED unit pixel circuit comprising: a first micro-LED, a second micro-LED and a third micro-LED configured to emit light based on a driving current; a driving transistor configured to control the driving current, wherein the driving transistor is connected between a low-potential power line and a cathode electrode of each of the first micro-LED, the second micro-LED, and the third micro-LED; a storage capacitor connected between a gate electrode and a source electrode of the driving transistor; and a first transistor configured to apply a data voltage to the gate electrode of the driving transistor.

In some implementations of the second aspect, a first power line is connected to an anode electrode of the first micro-LED, a second power line is connected to an anode electrode of the second micro-LED, and a third power line is connected to an anode electrode of the third micro-LED.

In some implementations of the second aspect, when the first micro-LED is selected to emit light, a high-potential voltage is applied to the first power line, while a low-potential voltage is applied to the second and third power lines, wherein when the second micro-LED is selected to emit light, the high-potential voltage is applied to the second power line, while the low-potential voltage is applied to the first and third power lines, wherein when the third micro-LED is selected to emit light, the high-potential voltage is applied to the third power line, while the low-potential voltage is applied to the first and second power lines.

In some implementations of the second aspect, the transparent micro-LED unit pixel circuit further comprises a second transistor configured to apply an initialization voltage to the gate electrode of the driving transistor.

In some implementations of the second aspect, the transparent micro-LED unit pixel circuit further comprises a third transistor configured to apply a reference voltage to the source electrode of the driving transistor.

A third aspect of the present disclosure provides a transparent micro-LED unit pixel circuit comprising: a first micro-LED, a second micro-LED and a third micro-LED configured to emit light based on a driving current; a first scan transistor connected to an anode electrode of the first micro-LED; a second scan transistor connected to an anode electrode of the second micro-LED; a third scan transistor connected to an anode electrode of the third micro-LED; a driving transistor configured to control the driving current, wherein the driving transistor is connected between a high-potential power line and each of the first scan transistor, the second scan transistor, and the third scan transistor; a storage capacitor connected between a gate electrode and a source electrode of the driving transistor; and a first transistor configured to apply a data voltage to the gate electrode of the driving transistor.

In some implementations of the third aspect, the first scan transistor is turned on in response to a first scan signal, the second scan transistor is turned on in response to a second scan signal, and the third scan transistor is turned on in response to a third scan signal.

In some implementations of the third aspect, when the first micro-LED is selected to emit light, the first scan signal is enabled while the second and third scan signals are disabled, wherein when the second micro-LED is selected to emit light, the second scan signal is enabled while the first and third scan signals are disabled, wherein when the third micro-LED is selected to emit light, the third scan signal is enabled while the first and second scan signals are disabled.

In some implementations of the third aspect, the transparent micro-LED unit pixel circuit further comprises a second transistor configured to apply an initialization voltage to the gate electrode of the driving transistor.

In some implementations of the third aspect, the transparent micro-LED unit pixel circuit further comprises a third transistor configured to apply a reference voltage to the source electrode of the driving transistor.

A fourth aspect of the present disclosure provides a transparent micro-LED display device comprising: a transparent display panel including a light-emitting area and a transmissive area, wherein the light-emitting area includes a plurality of unit pixel circuits; wherein each of the plurality of unit pixel circuits includes: a first micro-LED, a second micro-LED and a third micro-LED configured to emit light based on a driving current; a driving transistor configured to control the driving current, wherein the driving transistor is connected between a high-potential power line and an anode electrode of each of the first micro-LED, the second micro-LED, and the third micro-LED; a storage capacitor connected between a gate electrode and a source electrode of the driving transistor; and a first transistor configured to apply a data voltage to the gate electrode of the driving transistor.

In some implementations of the fourth aspect, a first power line is connected to a cathode electrode of the first micro-LED, a second power line is connected to a cathode electrode of the second micro-LED, and a third power line is connected to a cathode electrode of the third micro-LED.

In some implementations of the fourth aspect, when the first micro-LED is selected to emit light, a low-potential voltage is applied to the first power line, while a high-potential voltage is applied to the second and third power lines, wherein when the second micro-LED is selected to emit light, the low-potential voltage is applied to the second power line, while the high-potential voltage is applied to the first and third power lines, wherein when the third micro-LED is selected to emit light, the low-potential voltage is applied to the third power line, while the high-potential voltage is applied to the first and second power lines.

In some implementations of the fourth aspect, each of the plurality of unit pixel circuits further includes a second transistor configured to apply an initialization voltage to the gate electrode of the driving transistor.

In some implementations of the fourth aspect, each of the plurality of unit pixel circuits further includes a third transistor configured to apply a reference voltage to the source electrode of the driving transistor.

In some implementations of the fifth aspect, a micro-LED display device comprising: a display panel including a light-emitting area, wherein the light-emitting area includes a plurality of unit pixel circuits; wherein at least one of the unit pixel circuits includes: a plurality of micro-LEDs configured to emit light based on a driving current; and a driving transistor coupled to the plurality of micro-LEDs and configured to control the driving current through a selected one of the micro-LEDs to emit light.

In some implementations of the fifth aspect, remaining ones of the micro-LEDs are turned off.

In some implementations of the fifth aspect, the driving transistor is coupled between a first power line and a first electrode of each of the micro-LEDs.

In some implementations of the fifth aspect, the first electrode of each of the micro-LEDs is an anode of each of the micro-LEDs, and a cathode of the selected one of the micro-LEDs is connected to a first potential voltage and cathodes of the remaining ones of the micro-LEDs are connected to a second potential voltage different from the first potential voltage.

In some implementations of the fifth aspect, the first electrode of each of the micro-LEDs is a cathode of each of the micro-LEDs, and an anode of the selected one of the micro-LEDs is connected to a first potential voltage and anodes of the remaining ones of the micro-LEDs are connected to a second potential voltage different from the first potential voltage.

In some implementations of the fifth aspect, a first scan transistor connected between the driving transistor and the selected one of the micro-LEDs is enabled, while second scan transistors connected between the driving transistor and the remaining ones of the micro-LEDs is disabled.

In some implementations of the fifth aspect, the display panel further includes the transmissive area, the transmissive area lacks the driving transistor.

In some implementations of the fifth aspect, in the light-emitting area, a ratio of a driving transistor to the micro-LEDs is less than one.

In some implementations of the fifth aspect, two or more of the micro-LEDs coupled to the driving transistor are configured to emit a same color.

In some implementations of the fifth aspect, two or more of the micro-LEDs coupled to the driving transistor are configured to emit a red color.

Although the embodiments of the present disclosure have been described in more detail with reference to the accompanying drawings, the present disclosure is not necessarily limited to these embodiments, and may be modified in a various manner within the scope of the technical spirit of the present disclosure. Accordingly, the embodiments as disclosed in the present disclosure are intended to describe rather than limit the technical idea of the present disclosure, and the scope of the technical idea of the present disclosure is not limited by these embodiments. Therefore, it should be understood that the embodiments described above are not restrictive but illustrative in all respects. The scope of protection of the present disclosure should be interpreted according to the scope of claims, and all technical ideas within an equivalent scope thereto should be interpreted as being included in the scope of rights of the present disclosure.

What is claimed is:

1. A transparent micro-LED unit pixel circuit comprising:

a first micro-LED, a second micro-LED and a third micro-LED configured to emit light based on a driving current;

a driving transistor configured to control the driving current, wherein the driving transistor is connected between a high-potential power line and an anode electrode of each of the first micro-LED, the second micro-LED, and the third micro-LED;

a storage capacitor connected between a gate electrode and a source electrode of the driving transistor;

a first transistor configured to apply a data voltage to the gate electrode of the driving transistor;

a first power line connected to a cathode electrode of the first micro-LED;

a second power line connected to a cathode electrode of the second micro-LED; and a third power line connected to a cathode electrode of the third micro-LED, wherein depending on a low-potential voltage or a high-potential voltage applied to the first, second, and third power lines, one of the first, second, and third micro-LEDs emits light, wherein when the first micro-LED is selected to emit light, the low-potential voltage is applied to the first power line, while the high-potential voltage is applied to the second and third power lines, wherein when the second micro-LED is selected to emit light, the low-potential voltage is applied to the second power line, while the high-potential voltage is applied to the first and third power lines, and wherein when the third micro-LED is selected to emit light, the low-potential voltage is applied to the third power line, while the high-potential voltage is applied to the first and second power lines.

2. The transparent micro-LED unit pixel circuit of claim 1, wherein the transparent micro-LED unit pixel circuit further comprises a second transistor configured to apply an initialization voltage to the gate electrode of the driving transistor.

3. The transparent micro-LED unit pixel circuit of claim 2, wherein the transparent micro-LED unit pixel circuit further comprises a third transistor configured to apply a reference voltage to the source electrode of the driving transistor.

4. A transparent micro-LED unit pixel circuit comprising:

a first micro-LED, a second micro-LED and a third micro-LED configured to emit light based on a driving current;

a driving transistor configured to control the driving current, wherein the driving transistor is connected between a low-potential power line and a cathode electrode of each of the first micro-LED, the second micro-LED, and the third micro-LED;

a storage capacitor connected between a gate electrode and a source electrode of the driving transistor;

a first transistor configured to apply a data voltage to the gate electrode of the driving transistor;

a first power line connected to an anode electrode of the first micro-LED;

a second power line connected to an anode electrode of the second micro-LED; and a third power line connected to an anode electrode of the third micro-LED, wherein depending on a low-potential voltage or a high-potential voltage applied to the first, second, and third power lines, one of the first, second, and third micro-LEDs emits light, wherein when the first micro-LED is selected to emit light, the high-potential voltage is applied to the first power line, while the low-potential voltage is applied to the second and third power lines, wherein when the second micro-LED is selected to emit light, the high-potential voltage is applied to the second power line, while the low-potential voltage is applied to the first and third power lines, wherein when the third micro-LED is selected to emit light, the high-potential voltage is applied to the third power line, while the low-potential voltage is applied to the first and second power lines.

5. The transparent micro-LED unit pixel circuit of claim 4, wherein the transparent micro-LED unit pixel circuit further comprises a second transistor configured to apply an initialization voltage to the gate electrode of the driving transistor.

6. The transparent micro-LED unit pixel circuit of claim 5, wherein the transparent micro-LED unit pixel circuit further comprises a third transistor configured to apply a reference voltage to the source electrode of the driving transistor.

7. A transparent micro-LED unit pixel circuit comprising:

a first micro-LED, a second micro-LED and a third micro-LED configured to emit light based on a driving current;

a first scan transistor connected between an anode electrode of the first micro-LED and a driving transistor;

a second scan transistor connected between an anode electrode of the second micro-LED and the driving transistor;

a third scan transistor connected between an anode electrode of the third micro-LED and the driving transistor;

the driving transistor configured to control the driving current, wherein the driving transistor is connected between a high-potential power line and each of the first scan transistor, the second scan transistor, and the third scan transistor;

a storage capacitor connected between a gate electrode and a source electrode of the driving transistor; and a first transistor configured to apply a data voltage to the gate electrode of the driving transistor, wherein depending on a first, second, and third scan signal applied to the first, second, and third scan transistors, one of the first, second, and third micro-LEDs emits light, wherein one of the first, second, and third scan transistors is turned on in response to one of the first, second, and third scan signals, wherein when the first micro-LED is selected to emit light, the first scan signal is enabled while the second and third scan signals are disabled, wherein when the second micro-LED is selected to emit light, the second scan signal is enabled while the first and third scan signals are disabled, and wherein when the third micro-LED is selected to emit light, the third scan signal is enabled while the first and second scan signals are disabled.

8. The transparent micro-LED unit pixel circuit of claim 7, wherein the transparent micro-LED unit pixel circuit further comprises a second transistor configured to apply an initialization voltage to the gate electrode of the driving transistor.

9. The transparent micro-LED unit pixel circuit of claim 8, wherein the transparent micro-LED unit pixel circuit further comprises a third transistor configured to apply a reference voltage to the source electrode of the driving transistor.

10. A micro-LED display device comprising:

a display panel including a light-emitting area, wherein the light-emitting area includes a plurality of unit pixel circuits;

wherein at least one of the unit pixel circuits includes:

a plurality of micro-LEDs configured to emit light based on a driving current; and a driving transistor coupled to the plurality of micro-LEDs and configured to control the driving current through a selected one of the micro-LEDs to emit light, wherein the driving transistor is coupled between a first power line and a first electrode of each of the micro-LEDs, wherein depending on a low-potential voltage or a high-potential voltage applied to the first electrode of each of the micro-LEDs, one of the micro-LEDs emits light, wherein the first electrode of each of the micro-LEDs is an anode of each of the micro-LEDs, and a cathode of the selected one of the micro-LEDs is connected to the low potential voltage and cathodes of the remaining ones of the micro-LEDs are connected to the high potential voltage, wherein when a first micro-LED of the micro-LEDs is selected to emit light, the low-potential voltage is applied to a cathode of the first micro-LED, while the high-potential voltage is applied to cathodes of the remaining ones of the micro-LEDs.

11. The micro-LED display device of claim 10, wherein remaining ones of the micro-LEDs are turned off.

12. The micro-LED display device of claim 10, wherein the display panel further includes the transmissive area, and the transmissive area lacks the driving transistor.

13. The micro-LED display device of claim 10, wherein in the light-emitting area, a ratio of a driving transistor to the micro-LEDs is less than one.

14. The micro-LED display device of claim 10, wherein two or more of the micro-LEDs coupled to the driving transistor are configured to emit a same color.

15. The micro-LED display device of claim 10, wherein two or more of the micro-LEDs coupled to the driving transistor are configured to emit a red color.

* * * * *